US008702124B2

(12) United States Patent
Williams et al.

(10) Patent No.: US 8,702,124 B2
(45) Date of Patent: Apr. 22, 2014

(54) SIDE AIRBAG DEPLOYMENT ARRANGEMENT

(71) Applicant: Chrysler Group LLC, Auburn Hills, MI (US)

(72) Inventors: Shawn R. Williams, Auburn Hills, MI (US); Joseph G. Lemmon, Chesterfield, MI (US); Robert P. Kuhr, Farmington Hills, MI (US); Neil Thomas, Detroit, MI (US); Steven M. Johnson, Shelby Township, MI (US); Cedric Stokes, Detroit, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/621,418

(22) Filed: Sep. 17, 2012

(65) Prior Publication Data
US 2013/0069349 A1    Mar. 21, 2013

Related U.S. Application Data

(60) Provisional application No. 61/537,385, filed on Sep. 21, 2011.

(51) Int. Cl.
*B60R 21/213*    (2011.01)
(52) U.S. Cl.
USPC ..................... 280/730.2; 280/728.2
(58) Field of Classification Search
USPC ......................... 280/728.2, 730.2; 296/187.12
IPC .................................................... B60R 21/213
See application file for complete search history.

(56) References Cited

U.S. PATENT DOCUMENTS

| 4,017,756 | A | | 4/1977 | Davidson | |
|---|---|---|---|---|---|
| 5,605,346 | A | * | 2/1997 | Cheung et al. | 280/728.2 |
| 6,254,123 | B1 | * | 7/2001 | Urushi et al. | 280/730.2 |
| 6,305,707 | B1 | * | 10/2001 | Ishiyama et al. | 280/728.2 |
| 6,371,512 | B1 | * | 4/2002 | Asano et al. | 280/730.2 |
| 6,520,533 | B2 | * | 2/2003 | Tanase et al. | 280/730.2 |
| 6,530,594 | B1 | * | 3/2003 | Nakajima et al. | 280/730.2 |
| 6,565,116 | B1 | * | 5/2003 | Tajima et al. | 280/730.2 |
| 6,719,321 | B2 | * | 4/2004 | Yasuhara et al. | 280/730.2 |
| 6,793,241 | B2 | * | 9/2004 | Wallner et al. | 280/730.2 |
| 6,843,502 | B2 | * | 1/2005 | Aoki et al. | 280/730.2 |
| 7,134,682 | B2 | * | 11/2006 | Totsuka et al. | 280/728.2 |
| 7,172,211 | B2 | * | 2/2007 | Hirose | 280/730.2 |
| 7,175,196 | B2 | * | 2/2007 | Boxey | 280/730.2 |
| 7,182,366 | B2 | * | 2/2007 | Enriquez | 280/730.2 |
| 7,322,601 | B2 | * | 1/2008 | Bertossi | 280/730.2 |
| 7,338,071 | B2 | * | 3/2008 | Noguchi et al. | 280/730.2 |
| 7,445,233 | B2 | * | 11/2008 | McKimson | 280/730.2 |
| 7,673,897 | B2 | * | 3/2010 | Ochiai | 280/730.2 |
| 7,766,378 | B2 | * | 8/2010 | Miura et al. | 280/730.2 |
| 7,896,389 | B2 | * | 3/2011 | Jang et al. | 280/730.2 |

(Continued)

*Primary Examiner* — Faye M Fleming
*Assistant Examiner* — Laura Freedman
(74) *Attorney, Agent, or Firm* — Ralph E Smith

(57) ABSTRACT

An airbag deployment system for a vehicle is provided. The system can include an airbag positioned between a vehicle frame and a headliner, and a trim member positioned inboard of the frame. The system can also include a deployment ramp coupled to the frame and the trim member. The deployment ramp can have a ramp surface. The ramp surface can be positioned and configured such that when the airbag is deployed a portion of the airbag engages the ramp surface and the trim member to urge the trim member in an outboard direction toward the frame.

18 Claims, 4 Drawing Sheets

(56) References Cited

U.S. PATENT DOCUMENTS 7,934,748 B2 * 5/2011 Torii .......................... 280/730.2
7,963,551 B2 * 6/2011 Matsuoka et al. ......... 280/730.2
2006/0267315 A1 * 11/2006 White, Jr. .................. 280/730.2

* cited by examiner

SIDE AIRBAG DEPLOYMENT ARRANGEMENT

CROSS-REFERENCE TO RELATED APPLICATION

This application claims the benefit of U.S. Provisional Ser. No. 61/537,385, filed Sep. 21, 2011.

FIELD

The present teachings relate to vehicle safety systems, and more particularly to a side airbag deployment arrangement.

BACKGROUND

Many modern vehicles employ airbag systems as a form of passenger restraint. Typically, airbags serve to absorb the kinetic energy of a passenger generated during an impact event by inflating into a surface operable to contact the passenger to absorb the passenger's kinetic energy. Generally, airbag systems are positioned in various locations throughout the vehicle, such as the dashboard, steering wheel, sidewall of the passenger seat and the headliner. These airbag systems are usually hidden from view by various trim components. In certain instances, it can be desirable to guide the airbag during deployment in a predetermined direction.

SUMMARY

According to various embodiments, provided is an airbag deployment system for a vehicle. The system can include an airbag positioned between a vehicle frame and a headliner, and a trim member positioned inboard of the frame. The system can also include a deployment ramp coupled to the frame and the trim member. The deployment ramp can have a ramp surface. The ramp surface can be positioned and configured such that when the airbag is deployed a portion of the airbag engages the ramp surface and the trim member to urge the trim member in an outboard direction toward the frame.

In one configuration, the deployment ramp is positioned and configured so that the airbag deploys along the ramp surface with uninterrupted airbag movement along the ramp surface to urge movement of the trim member in the outboard direction.

In another form, an airbag deployment system for a vehicle includes a first engagement member, a second engagement member and a wall that couples the first engagement member to the second engagement member. The first engagement member is coupleable to a frame of the vehicle such that a portion of the first engagement member is positioned adjacent to a first surface of the frame. The first engagement member includes a first rail positioned adjacent to a second surface of the frame to contact an overhead side airbag during deployment, where the second surface of the frame is opposite the first surface of the frame. The second engagement member is spaced apart from the first engagement member. The second engagement member is coupleable to the frame such that a portion of the second engagement member is positioned adjacent to the first surface of the frame. The second engagement member includes a second rail positioned adjacent to the second surface of the frame to contact the overhead side airbag during deployment. The wall includes a height less than a height of the first engagement member and a height of the second engagement member. The wall is in contact with the second surface of the frame when the first engagement member and second engagement member are coupled to the frame. The wall is shaped to contact the overhead side airbag during deployment.

In another form, an airbag deployment system for a vehicle includes a trim member coupleable to a first surface of a frame of the vehicle and includes a deployment arrangement at a first end. The deployment arrangement includes a first hook and a second hook. The first hook is coupleable to the frame such that a portion of the first hook is disposed adjacent to a second surface of the frame. The first hook includes a first rail positioned adjacent to the first surface of the frame to contact an overhead side airbag during deployment. The second hook is spaced apart from the first hook. The second hook is coupleable to the frame such that a portion of the second hook is disposed adjacent to the second surface of the frame. The second hook includes a second rail positioned adjacent to the first surface of the frame to contact the overhead side airbag during deployment.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
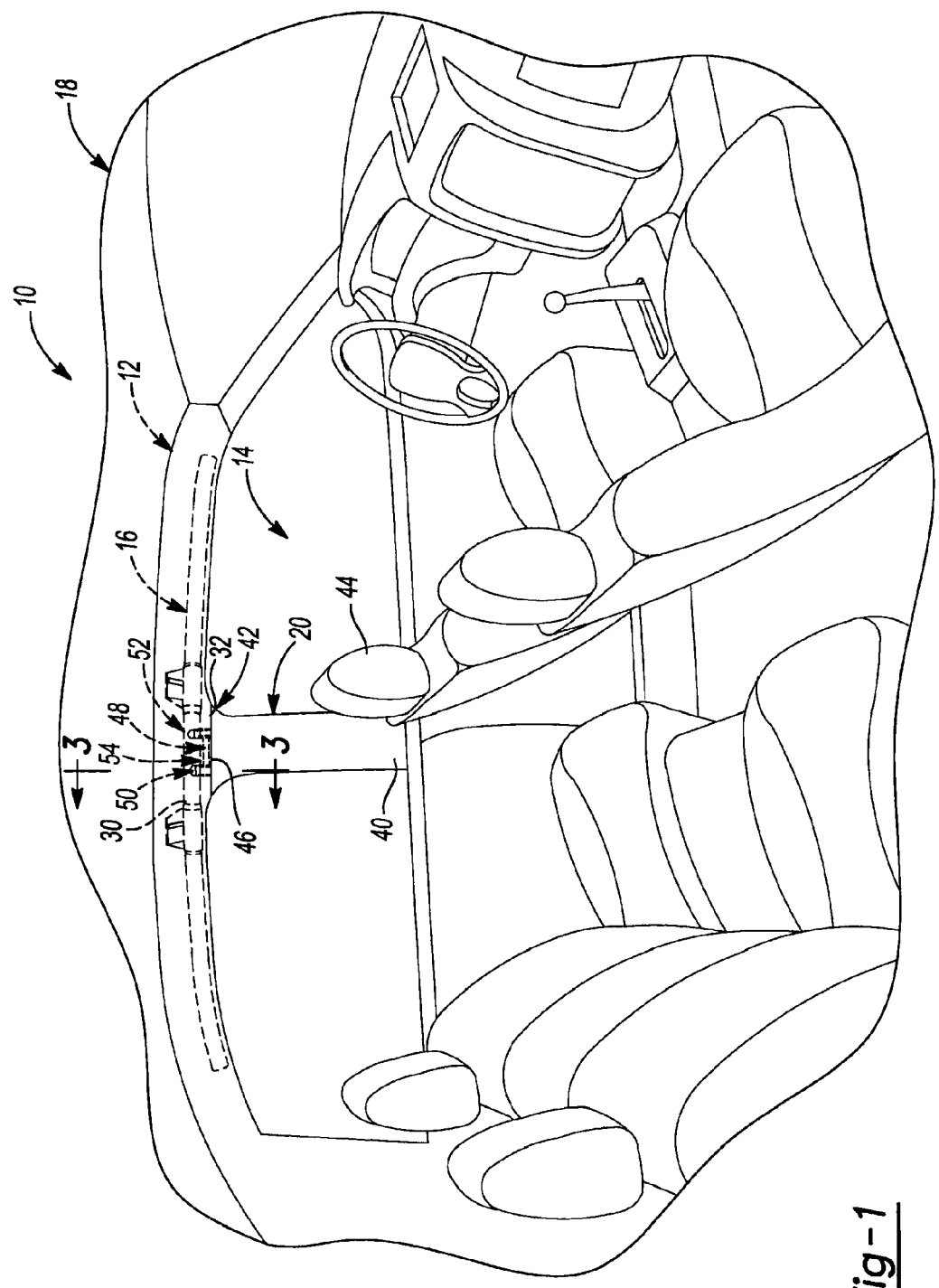
FIG. 1 is a perspective view of a motor vehicle having a side airbag deployment arrangement according to an exemplary embodiment of the present disclosure.

In exemplary embodiments disclosed herein, an airbag deployment system for a vehicle is provided. The system can include an airbag positioned between a vehicle frame and a headliner, and a trim member positioned inboard of the frame. The system can also include a deployment ramp joined to the frame and the trim member. The deployment ramp may be an integral portion of the trim member. The deployment ramp can have a ramp surface configuration such that the airbag can deploy in an uninterrupted movement. The ramp surface can be positioned and configured such that when the airbag is deployed a portion of the airbag engages the ramp surface and the trim member to urge the trim member in an outboard direction toward the frame.

In an exemplary embodiment, with reference to FIGS. 1-6, a motor vehicle 10 is shown, which can include a frame 12 defining a passenger area 14. As the motor vehicle 10 can be substantially symmetrical, only one side of the motor vehicle 10 will be described and illustrated herein, with the understanding that the opposite side of the motor vehicle 10 is a mirror image of that described. An overhead side airbag system 16 can be coupled to the frame 12, along with a headliner 18 and at least one trim member 20. It should be noted that the motor vehicle 10 illustrated and described herein is merely exemplary, as a motor vehicle incorporating the trim member 20 could include some or more components than those illustrated herein. The headliner 18 and at least one trim member 20 can cooperate to enable the overhead side airbag system 16 to inflate and expand into the passenger area 14 and can also provide an aesthetically pleasing environment for passengers within the passenger area 14.

Figure 2:
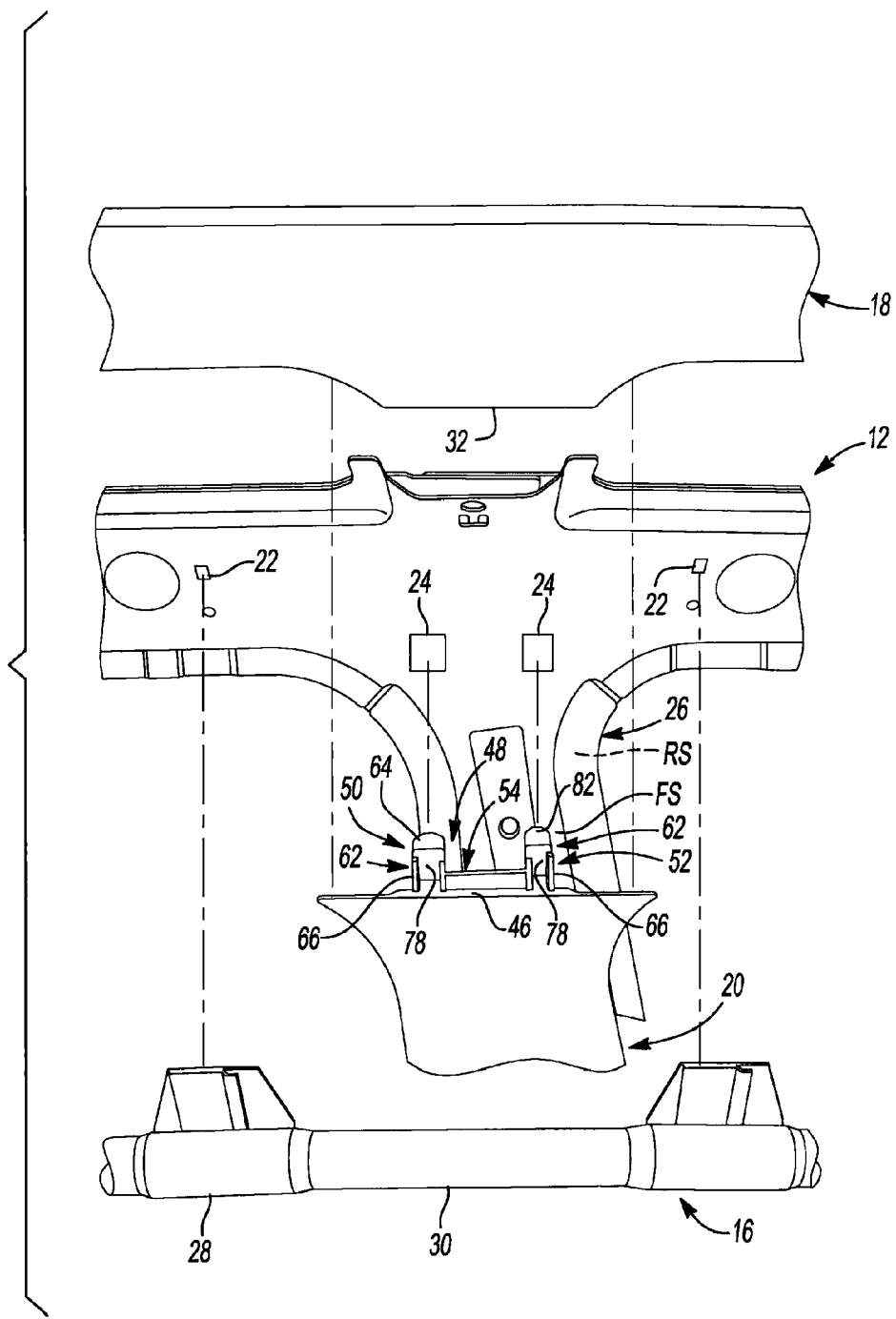
FIG. 2 is an exploded view of the side airbag deployment arrangement of FIG. 1.

In an exemplary embodiment, with reference to FIG. 2, the frame 12 can include airbag mounting features 22 and trim member mounting features 24, which can be arranged on or near one or more pillars 26 of the frame 12. It should be noted that although the motor vehicle 10 is described and illustrated herein as comprising one pillar 26 with airbag mounting features 22 and trim member mounting features 24, the motor vehicle 10 could include any number of pillars 26 having airbag mounting features 22 and trim member mounting features 24. As a further example, the pillar 26 can comprise a B-pillar, however, the trim member 20 could be coupled to a C-pillar, D-pillar or A-pillar, if desired. In this regard, the trim member 20 could be positioned inboard of a C-pillar of the frame 12, however, the trim member 20 could be positioned inboard of a D-pillar of the frame 12. In one example, both the airbag mounting features 22 and the trim member mounting features 24 can comprise unthreaded apertures. Generally, the airbag mounting features 22 can be positioned adjacent to or near the pillar 26 of the frame 12, while the trim member mounting features 24 can be defined through the pillar 26 of the frame 12.

Figure 3:
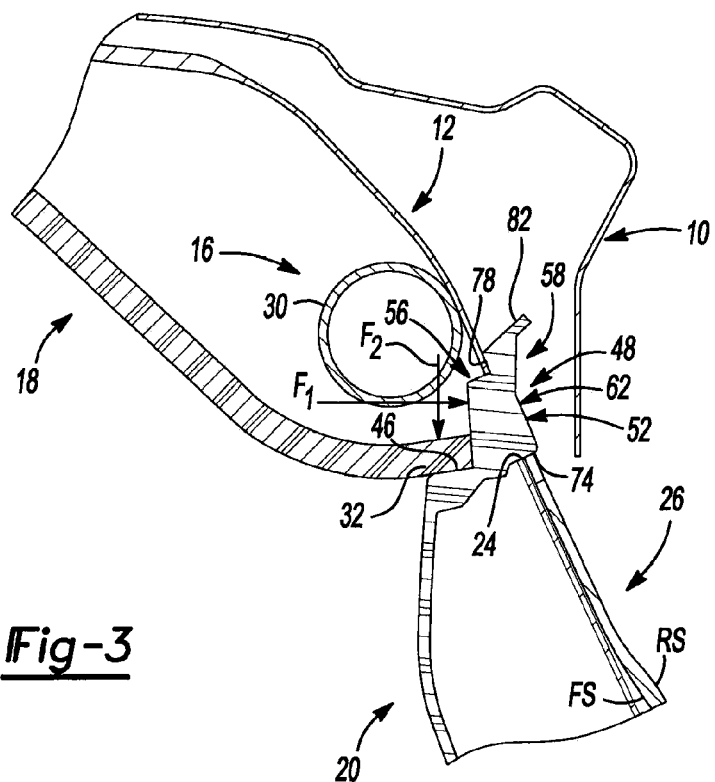
FIG. 3 is a cross-sectional view of the side airbag deployment arrangement taken along line 3-3 of FIG. 1.

In this regard, with reference to FIG. 3, the pillar 26 can have a first, inboard or front surface FS opposite a second, outboard or rear surface RS. Generally, the inboard or front surface FS can be adjacent to the passenger area 14, while the outboard or rear surface RS can be positioned away from the passenger area 14, toward the exterior of the motor vehicle 10. The trim member mounting features 24 can be defined through the pillar 26 so as to extend from the front surface FS to the rear surface RS. As will be discussed, with reference to FIG. 2, the airbag mounting features 22 can be configured to receive a threaded fastener therethrough to mount the overhead side airbag system 16 to the frame 12. With regard to the trim member mounting features 24, the trim member mounting features 24 can be configured to receive a portion of the trim member 20 therethrough to couple the trim member 20 to the frame 12, as will be discussed further herein. Generally, the trim member 20 can be coupled to the frame 12 such that the trim member 20 is positioned adjacent to the front surface FS of the pillar 26 (FIG. 3).

With reference to FIG. 2, the overhead side airbag system 16 can comprise any suitable overhead side impact airbag system, and in one example, can include an inflator 28 and an airbag 30. It should be noted that although the inflator 28 and airbag 30 are illustrated herein as being cylindrical prior to inflation, the inflator 28 and airbag 30 can have any desired shape, such as square, rectangular, oval, etc. The inflator 28 can be responsive to a signal to inflate the airbag 30. The inflator 28 and the airbag 30 can be enclosed by the headliner 18. As will be discussed, as the airbag 30 inflates, the airbag 30 can move the headliner 18 and substantially simultaneously contact the trim member 20 so that the trim member 20 can direct the inflation of the airbag 30 into the passenger area 14. In addition, the force generated by the inflation of the airbag 30 can move the airbag, for example, in an outward and downward direction, against the trim member 20 thereby urging the trim member 20 outboard towards the frame 12.

With reference to FIGS. 1-3, the headliner 18 can be coupled to the frame 12 and can span the passenger area 14. The headliner 18 can be positioned such that the headliner 18 can enclose the overhead side airbag system 16 (FIG. 3). An end 32 of the headliner 18 can be coupled to or in contact with the trim member 20. During the inflation of the airbag 30, the expanding airbag 30 can move or push the end 32 of the headliner 18 away from the trim member 20 to enable the airbag 30 to expand into the passenger area 14.

With reference to FIG. 3, the trim member 20 can guide the airbag 30 during deployment inboard into the passenger area 14, while also further urging the trim member 20 outboard towards the frame 12. The trim member 20 can be composed out of a suitable polymeric material, such as a thermoplastic. Generally, with reference to FIG. 1, the trim member 20 can include a first end 40 and a second end 42. The trim member 20 can be positioned within the passenger area 14 such that the first end 40 is adjacent to a passenger seating surface 44 and the second end 42 is positioned adjacent to the headliner 18. The second end 42 can include a lower edge portion or headliner contact surface 46 and a deployment ramp 48. The lower edge portion or headliner contact surface 46 can be formed adjacent to the deployment ramp 48.

Figure 4:
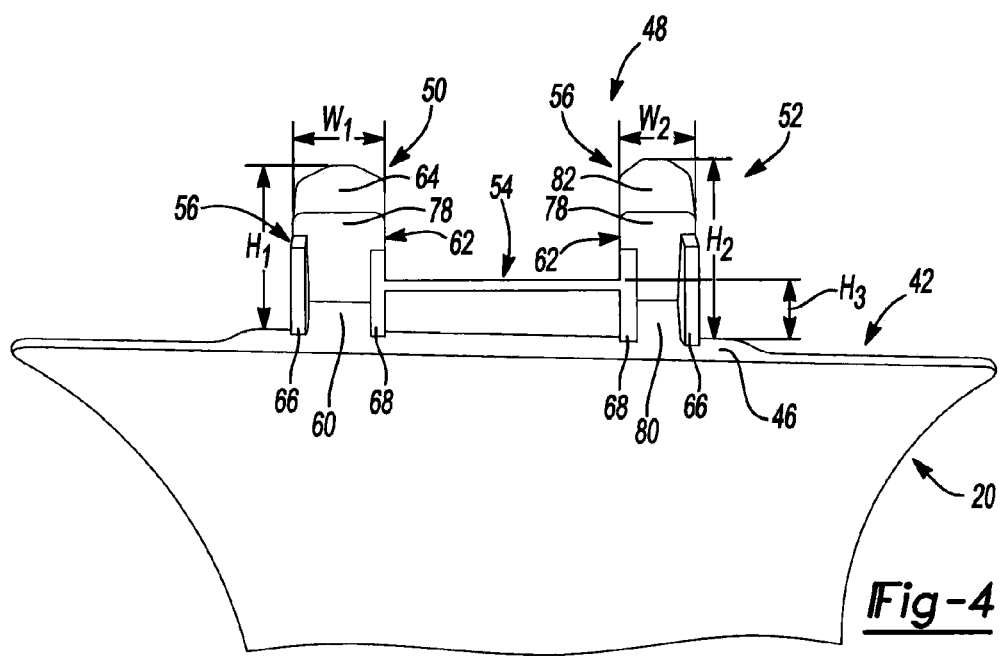
FIG. 4 is a front view of the side airbag deployment arrangement of FIG. 1.

With reference to FIGS. 3 and 4, the headliner contact surface 46 can provide a surface for attachment of the headliner 18 to the trim member 20. For example, the headliner contact surface 46 can comprise a substantially flat surface, which can contact the headliner 18 to couple the headliner 18 to the trim member 20. It should be noted, however, that any suitable technique could be used to couple the headliner 18 to the trim member 20, such as the use of mechanical fasteners, rivets, adhesive, etc. Further, if desired, the headliner 18 need not be coupled directly to the trim member 20, but rather could be coupled to the frame 12 through mechanical fasteners, such as rivets or grommets, an adhesive, etc. Generally, the headliner 18 can contact the lower edge portion or headliner contact surface 46 and can abut a portion of the deployment ramp 48. In one example, the headliner contact surface 46 can have width of between about 2.0 millimeters (mm) and about 10 millimeters (mm). This can enable the headliner 18 to be moved out of the way by the force of the deploying airbag 30, as will be discussed herein.

With reference to FIGS. 1 and 4, the deployment ramp 48 can enable the trim member 20 to be urged outboard, towards the frame 12 during an impact event, and can also guide or direct the deployment of the airbag 30. In other words, the deployment ramp 48 can enable the trim member 20 to be urged from a generally inboard position to a generally outboard position. Generally, the deployment ramp 48 can be positioned and configured so that the airbag 30 can deploy along the deployment ramp 48 with uninterrupted movement of the airbag 30 along the deployment ramp 48 to urge movement of the trim member 20 in the outboard direction. In one example, the deployment ramp 48 is formed with the trim member 20. The deployment ramp 48 can include a first engagement member or first hook 50 and a second engagement member or second hook 52, which can be coupled together via a wall 54. The first hook 50 can be spaced apart from the second hook 54. The headliner 18 can rest on the headliner contact surface 46 so as to abut the first hook 50, second hook 52 and wall 54.

Generally, the first hook 50, second hook 52 and wall 54 can be integrally formed at the second end 42 of the trim member 20, however, the first hook 50, second hook 52 and wall 54 could be attached to the trim member 20 in a post processing step. Each of the first hook 50, second hook 52 and wall 54 can cooperate to direct the inflation of the airbag 30 toward the passenger area 14, and in turn, the force of the airbag 30 can push outward and downward on the first hook 50, second hook 52 and wall 54 to urge the trim member 20 in the outboard direction towards the frame 12. As will be discussed, the deployment ramp 48 can include a plurality of spaced apart ramped surfaces, which can be defined by a portion of the first hook 50 and the second hook 52.

Figure 5:
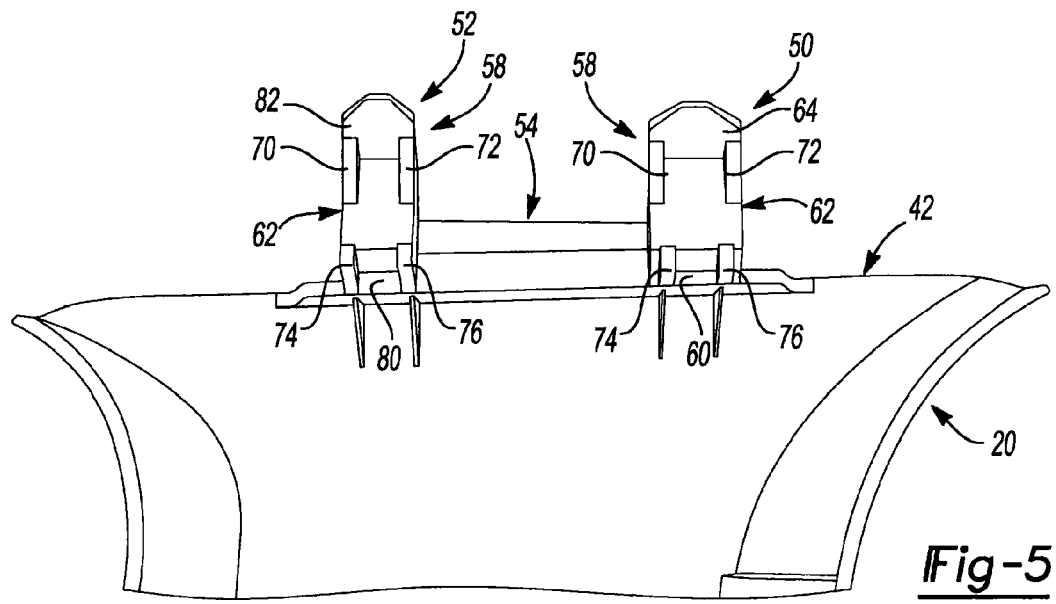
FIG. 5 is a rear view of the side airbag deployment arrangement of FIG. 1.

With reference to FIGS. 4 and 5, the first hook 50 can have a first side 56 (FIG. 4), a second side 58 (FIG. 5), a first portion 60, a second portion 62 and a third portion 64. The first hook 50 can be coupleable to the frame 12 of the motor vehicle 10 such that a portion of the first hook 50 is positioned adjacent to the rear surface RS of the pillar 26. As illustrated in FIG. 4, the first hook 50 can also have a width W1 and a height H1, which in one example, can be greater than a width W2 of the second hook 52 but less than a height H2 of the second hook 52. The first side 56 of the first hook 50 can include a first ramp or rail 66 and a second rail 68. The first rail 66 can extend from the first portion 60 through a majority of the second portion 62. The second rail 68 can extend from the first portion 60 through a majority of the second portion 62. The first rail 66 can have a greater thickness than the second rail 68, as the first rail 66 can contact a portion of the trim member mounting features 24 of the frame 12 when the trim member 20 is coupled to the pillar 26 (FIG. 3). In addition, the first rail 66 can contact the airbag 30 to direct the inflation of the airbag 30 into the passenger area 14. Generally, the first rail 66 can be positioned adjacent to the front surface FS of the pillar 26 to contact the airbag 30 during deployment.

With reference to FIG. 5, the second side 58 of the first hook 50 can include a first reinforcing member 70, a second reinforcing member 72, a first contact 74 and a second contact 76. The first reinforcing member 70 and the second reinforcing member 72 can be positioned substantially opposite each other on the second side 58. The first reinforcing member 70 and the second reinforcing member 72 can provide additional support for the third portion 64 of the first hook 50, and can extend from the second portion 62 to the third portion 64.

The first contact 74 can be positioned substantially opposite the second contact 76 on the second side 58, and each of the first contact 74 and second contact 76 can extend outwardly away from the second side 58. The first contact 74 and second contact 76 can contact a portion of the trim member mounting features 24 of the frame 12 when the trim member 20 is coupled to the frame 12 (FIG. 3). Thus, the first contact 74 and second contact 76 can assist in coupling the trim member 20 to the frame 12.

With reference to FIGS. 4 and 5, the first portion 60 can be coupled to the second end 42 of the trim member 20, and can extend outwardly from the second end 42 of the trim member 20. Generally, the first portion 60 can be angled relative to a longitudinal axis of the trim member 20. The second portion 62 can be coupled to the first portion 60, and can extend upwardly from the first portion 60 at an angle relative to a longitudinal axis of the trim member 20. With reference to FIGS. 3 and 4, the second portion 62 can include a contact surface 78 adjacent to the first rail 66, which can contact a rear surface RS of the pillar 26 when the trim member 20 is coupled to the frame 12.

Figure 6:
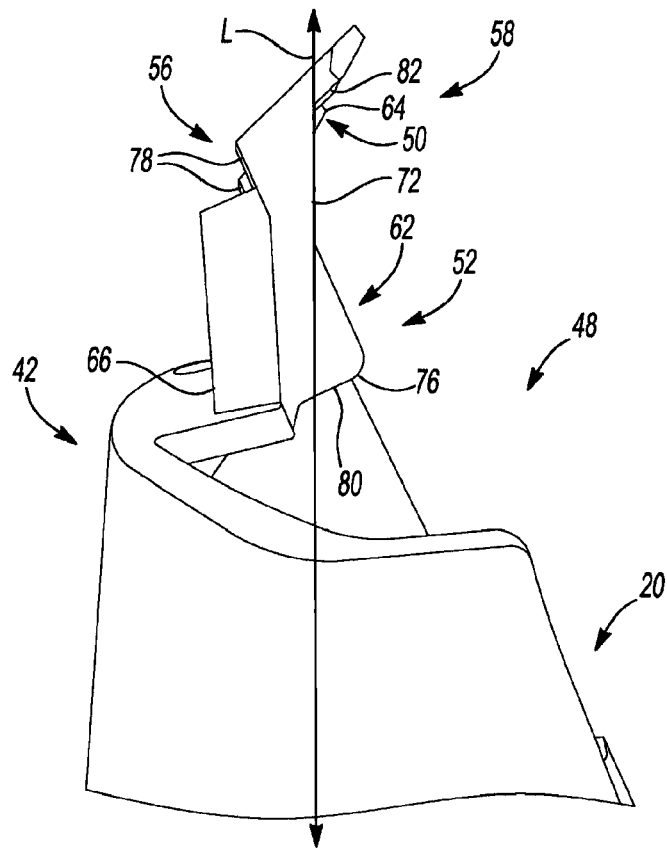
FIG. 6 is a side view of the side airbag deployment arrangement of FIG. 1.

With reference to FIG. 6, the third portion 64 can be coupled to the second portion 62, and can extend outwardly from the second portion 62 at an angle relative to a longitudinal axis L of the trim member 20. The third portion 64 can be positioned adjacent the rear surface RS of the pillar 26 when the trim member 20 is coupled to the frame 12 and can retain the trim member 20 within the trim member mounting features 24 of the frame 12 (FIG. 3).

With reference to FIGS. 3-6, as the second hook 52 can be similar to the first hook 50 described herein, only the differences between the first hook 50 and second hook 52 will be discussed in detail herein, and the same reference numerals will be used to denote the same or similar components. The second hook 52 can be coupleable to the frame 12 of the motor vehicle 10 such that a portion of the second hook 52 is positioned adjacent to the rear surface RS of the pillar 26. The second hook 52 can have the first side 56, the second side 58, a first portion 80, the second portion 62 and a third portion 82.

With reference to FIG. 6, the first portion 80 can be coupled to the second end 42 of the trim member 20, and can extend outwardly from the second end 42 of the trim member 20. Generally, the first portion 80 can be angled relative to a longitudinal axis L of the trim member 20. The third portion 82 can be coupled to the second portion 62, and can extend outwardly from the second portion 62 at an angle relative to the longitudinal axis L. Thus, the third portion 82 of the second hook 52 can extend beyond the second end 42 of the trim member 20 for a greater distance than the first hook 50. Generally, with reference to FIG. 3, the third portion 82 can be positioned adjacent the rear surface RS of the pillar 26 of the frame 12 when the trim member 20 is coupled to the frame 12 and can retain the trim member 20 within the trim member mounting features 24 of the frame 12.

With reference to FIG. 4, the wall 54 can be formed between the first hook 50 and the second hook 52. The wall 54 can be coupled to the second end 42 of the trim member 20 so as to extend outwardly away from the trim member 20. The wall 54 can have a height H3, which can be less than the height H1 of the first hook 50 and the height H2 of the second hook 52. The wall 54 can provide rigidity to the first hook 50 and second hook 52, and can assist in maintaining the engagement of the first hook 50 and the second hook 52 with the frame 12. Generally, the wall 54 can be positioned adjacent to the front surface FS of the pillar 26 to contact the airbag 30 during deployment. With reference to FIG. 1, the wall 54 can cooperate with the first hook 50 and second hook 52 to direct the airbag 30 toward the passenger area 14, and can receive a portion of the force of the airbag 30 as the airbag 30 expands to urge the trim member 20 in the outboard direction towards the frame 12. In one of various embodiments, the trim member 20 can lock and contact the frame 12 upon receipt of the force of the airbag 30, and in another of various examples, the trim member 20 can be urged against the frame 12.

With reference to FIGS. 1 and 2, in one example, in order to assemble the overhead side airbag system 16, headliner 18 and trim member 20 to the frame 12, the overhead side airbag system 16 can be coupled to the frame 12 via the airbag mounting features 22. Then, the first hook 50 and the second hook 52 can be inserted through the trim member mounting features 24 so that the contact surface 78 of the second portion 62 is in contact with the rear surface RS of the pillar 26 and the third portion 64 of the first hook 50 and the third portion 82 of the second hook 52 are adjacent to the rear surface RS of the pillar 26. Then, with the overhead side airbag system 16 and the trim member 20 coupled to the frame 12, the headliner 18 can be coupled to the frame 12. Generally, the headliner 18 can be coupled to the frame 12 so as to enclose the overhead side airbag system 16 and such that the end 32 of the headliner 18 rests against the second end 42 of the trim member 20 (FIG. 3).

During an impact event, the inflator 28 can receive a signal to inflate the airbag 30. As the airbag 30 inflates, the airbag 30 can contact the first hook 50, second hook 52 and wall 54 of the trim member 20, which can direct the inflation of the airbag 30 toward the passenger area 14. Generally, the deployment ramp 48 can be positioned and configured so that the airbag 30 can deploy along the deployment ramp 48 with uninterrupted movement of the airbag 30 along the deployment ramp 48 to urge movement of the trim member 20 in the outboard direction. For example, with reference to FIG. 3, as the airbag 30 inflates, the airbag 30 can exert an outward force F1 against the trim member 20 and a downward force F2 on the trim member 20. The application of the forces F1, F2 to the trim member 20 can urge the trim member 20 outboard towards the frame 12. In this regard, the application of the forces F1, F2 can cause the first hook 50 and the second portion 62 and the third portion 82 of the second hook 52 to contact the rear surface RS of the pillar 26, thereby urging the trim member 20 outboard towards the frame 12.

Thus, the deployment ramp 48 of the trim member 20 can direct the inflation of the airbag 30 toward the passenger area 14. The deployment ramp 48 can also cooperate with the inflating airbag 30 to urge the trim member 20 outboard, towards the frame 12 during an impact event, thereby increasing passenger safety. Further, the use of the deployment ramp 48 integrated with the trim member 20 and positioned at the headliner 18 and trim member 20 interface can improve airbag 30 deployment time. The deployment ramp 48 of the trim member 20 can also fill a cavity defined behind the headliner 18 and airbag 30 to inhibit the airbag 30 from inadvertent deployment into the cavity or pinching of the airbag 30 behind the trim member 20.

What is claimed is:

1. An airbag deployment system for a vehicle comprising:
   an airbag positioned between a vehicle frame and a headliner;
   a trim member positioned inboard of the frame;
   a deployment ramp coupled to the frame and the trim member, the deployment ramp having a first ramp surface and a second ramp surface, each of the first and second ramp surfaces being integral with and separated by a wall, the wall having a height less than each of the first and second ramp surfaces; and
   wherein the ramp surface is positioned and configured such that when the airbag is deployed a portion of the airbag engages the ramp surface and the trim member to urge the trim member in an outboard direction toward the frame.

2. The system of claim 1, wherein the deployment ramp is formed with the trim member.

3. The system of claim 2, wherein the trim member further comprises a lower edge portion formed adjacent to the deployment ramp.

4. The system of claim 3, wherein the lower edge portion has a width between about 2.0 millimeters (mm) and about 10 millimeters (mm).

5. The system of claim 4, wherein the headliner contacts the lower edge portion and abuts a portion of the deployment ramp.

6. The system of claim 1, wherein the deployment ramp is positioned and configured so that the airbag deploys along the ramp surface with uninterrupted airbag movement along the ramp surface to urge movement of the trim member in the outboard direction.

7. The system of claim 1, wherein the trim member is positioned inboard of a C-pillar of the frame.

8. The system of claim 1, wherein the trim member is positioned inboard of a D-pillar of the frame.

9. An airbag deployment system for a vehicle comprising:
   a first engagement member coupleable to a frame of the vehicle such that a portion of the first engagement member is positioned adjacent to a first surface of the frame, the first engagement member having a first rail positioned adjacent to a second surface of the frame to contact an overhead side airbag during deployment, the second surface of the frame opposite the first surface of the frame;
   a second engagement member spaced apart from the first engagement member, the second engagement member coupleable to the frame such that a portion of the second engagement member is positioned adjacent to the first surface of the frame, the second engagement member having a second rail positioned adjacent to the second surface of the frame to contact the overhead side airbag during deployment; and
   a wall that couples the first engagement member to the second engagement member, the wall having a height less than a height of the first engagement member and a height of the second engagement member, the wall in contact with the second surface of the frame when the first engagement member and second engagement member are coupled to the frame, the wall shaped to contact the overhead side airbag during deployment.

10. The system of claim 9, wherein the frame includes at least one pillar having the first surface opposite the second surface, a first aperture and a second aperture defined through the first surface and second surface, with the first engagement member coupleable to the first aperture and the second engagement member coupleable to the second aperture so that the portion of the first engagement member and the portion of the second engagement member are positioned adjacent to the first surface of the pillar and the first rail and second rail are positioned adjacent to the second surface of the pillar.

11. The system of claim 10, wherein the first engagement member, the second engagement member and the wall are integrally formed at an end of a trim member.

12. The system of claim 11, wherein the first engagement member comprises a first hook and the second engagement member comprises a second hook.

13. The system of claim 12, wherein the first hook has a width greater than a width of the second hook.

14. The system of claim 12, wherein each of the first hook and the second hook has a first portion, a second portion and a third portion, the first portion having a first end coupled to the end of the trim member so as to extend outwardly from the trim member at an angle relative to a longitudinal axis of the trim member and a second end coupled to the second portion, the second portion coupled to the first portion and the third portion, the third portion coupled to the second portion at an angle relative to the longitudinal axis of the trim member.

15. An airbag deployment system for a vehicle comprising:
   a trim member coupleable to a first surface of a frame of the vehicle and having a deployment arrangement at a first end including:
      a first hook coupleable to the frame such that a portion of the first hook is disposed adjacent to a second surface of the frame, the first hook having a first rail positioned adjacent to the first surface of the frame to contact an overhead side airbag during deployment;
      a second hook spaced apart from the first hook, the second hook coupleable to the frame such that a portion of the second hook is disposed adjacent to the second surface of the frame, the second hook having a second rail positioned adjacent to the first surface of the frame to contact the overhead side airbag during deployment; and
      a wall that couples the first hook to the second hook, the wall having a height less than a height of the first hook and a height of the second hook, the wall positioned adjacent to the first surface of the frame when the first hook and second hook are coupled to the frame, the wall shaped to contact the overhead side airbag during deployment.

16. The system of claim 15, wherein each of the first hook and the second hook has a first portion, a second portion and a third portion, the first portion having a first end coupled to the end of the trim member so as to extend outwardly from the trim member at an angle relative to a longitudinal axis of the trim member and a second end coupled to the second portion, the second portion coupled to the first portion and the third portion, the third portion coupled to the second portion at an angle relative to the longitudinal axis of the trim member.

17. The system of claim 16, wherein the third portion of each of the first hook and the second hook is positioned adjacent to the second surface of the frame when the first hook is coupled to a first aperture and the second hook is coupled to a second aperture.

18. The system of claim 17, wherein the second portion of each of the first hook and the second hook includes a contact surface that contacts the second surface of the frame when the first hook is coupled to the first aperture and the second hook is coupled to the second aperture.

* * * * *